(12) United States Patent
Maynard, Jr.

(10) Patent No.: US 6,369,797 B1
(45) Date of Patent: *Apr. 9, 2002

(54) MULTIPLE SIGNALING MOUSE WITH FACETED SURFACES

(76) Inventor: Stuart Tyrus Maynard, Jr., 12 Lookout Rd., Asheville, NC (US) 28805

( * ) Notice: Subject to any disclaimer, the term of this patent is extended or adjusted under 35 U.S.C. 154(b) by 0 days.

This patent is subject to a terminal disclaimer.

(21) Appl. No.: 09/035,405

(22) Filed: Mar. 5, 1998

Related U.S. Application Data

(63) Continuation of application No. 08/400,122, filed on Mar. 6, 1995, now Pat. No. 5,754,168, which is a continuation of application No. 08/091,909, filed on Jul. 16, 1993, now abandoned, which is a continuation of application No. 07/657,118, filed on Feb. 19, 1991, now Pat. No. 5,260,696.

(51) Int. Cl.[7] .................................................. G09G 5/08
(52) U.S. Cl. ......................................... 345/163; 345/164
(58) Field of Search ................................ 345/156, 157, 345/163, 164, 167, 165, 166, 158, 159; 74/471 XY; 463/31, 32, 37, 38

(56) References Cited

U.S. PATENT DOCUMENTS

| | | | | |
|---|---|---|---|---|
| 4,650,934 A | * | 3/1987 | Burke | 200/5 R |
| 4,806,917 A | * | 2/1989 | Hosgoe | 345/164 |
| 4,951,034 A | * | 8/1990 | Mazzone et al. | 345/164 |
| 4,973,176 A | * | 11/1990 | Dietrich | 400/715 |
| 5,115,227 A | * | 5/1992 | Keiji | 345/164 |
| 5,619,231 A | * | 4/1997 | Shouen | 345/163 |

FOREIGN PATENT DOCUMENTS

| | | | |
|---|---|---|---|
| JP | 59-139437 | * | 8/1984 |
| JP | 60-181818 | * | 9/1985 |
| JP | 2161755 | * | 1/1986 |

OTHER PUBLICATIONS

IBM Technical Diclosure Bulletin vol. 28, No. 5 Oct. 1985. "Smart Key".*

* cited by examiner

Primary Examiner—Chanh Nguyen

(57) ABSTRACT

A conventional monoplane mouse is constructed to move on a flat surface upon a single plane within which a contained sphere may rotate tangential with the single plane contacting the flat surface. Signal for XY cursor movement are derived from two or more counting sensors positioned at an equator of the rotatable sphere parallel with the single plane. The mouse invention defines two or more facets in the underside housing. The facet mouse can be tilted to one of the exclusive facets and moved on a flat surface to generate XY signals. The facet plane selected by tilt is identified by triggered pressure sensitive switches at each facet plane. The switches also function as undercarriage feet to define the virtual plane of contact to the flat surface. The facet planes in two and four facet embodiments are oriented with the orthogonally placed sphere counting sensors so that the interest of any two opposing facets is parallel with the plane of rotation of one of the counting wheels. A single sphere and counter apparatus can serve all facets, being placed at the intersect of all facets. To aid the hand in applying continuous downward pressure to the mouse onto a preferred facet, a hinged and elevatable palm hood is attached to the top of the mouse. The mouse enables a new user interface beyond the tradition ones of: 1.clicking keys by a finger and 2.whole arm movement of a mouse on an XY surface. By a tilting wrist motion, the user may instantly and continuously toggle 2,4, or more selection assigned to the facets provided.

9 Claims, 5 Drawing Sheets

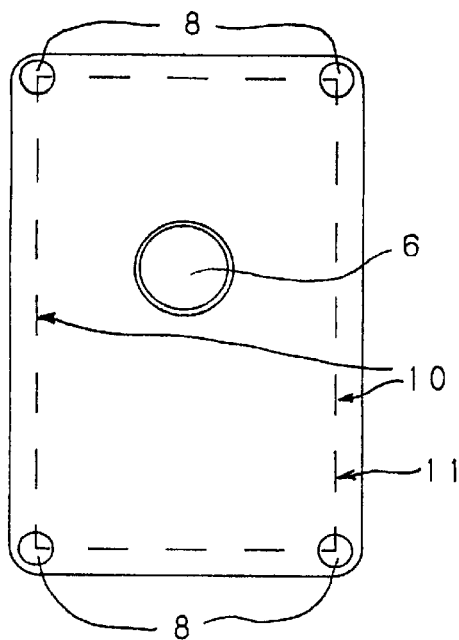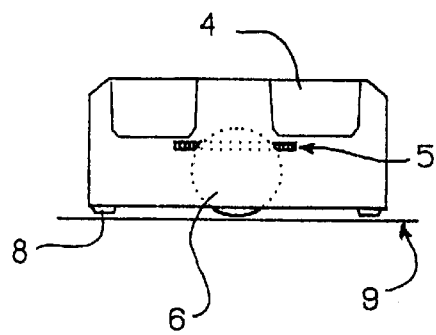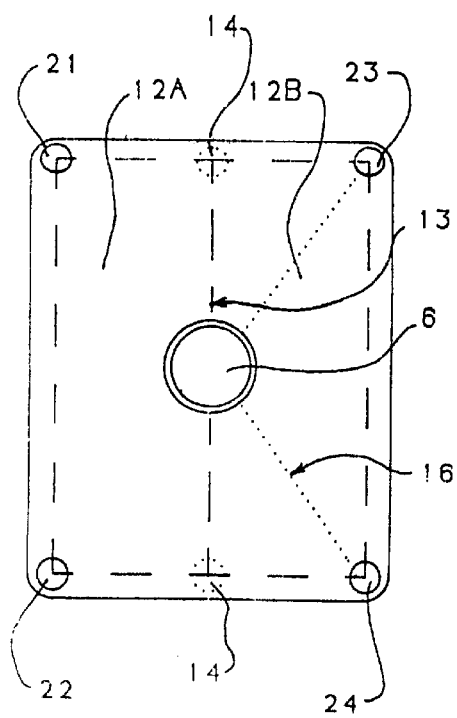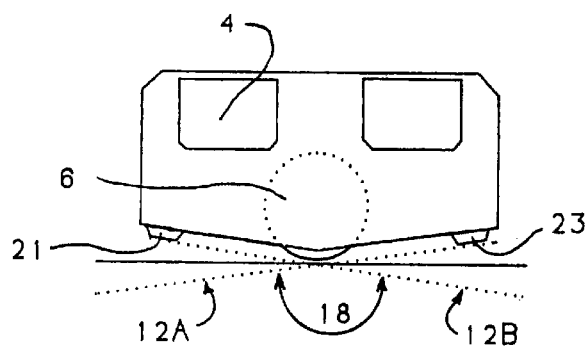

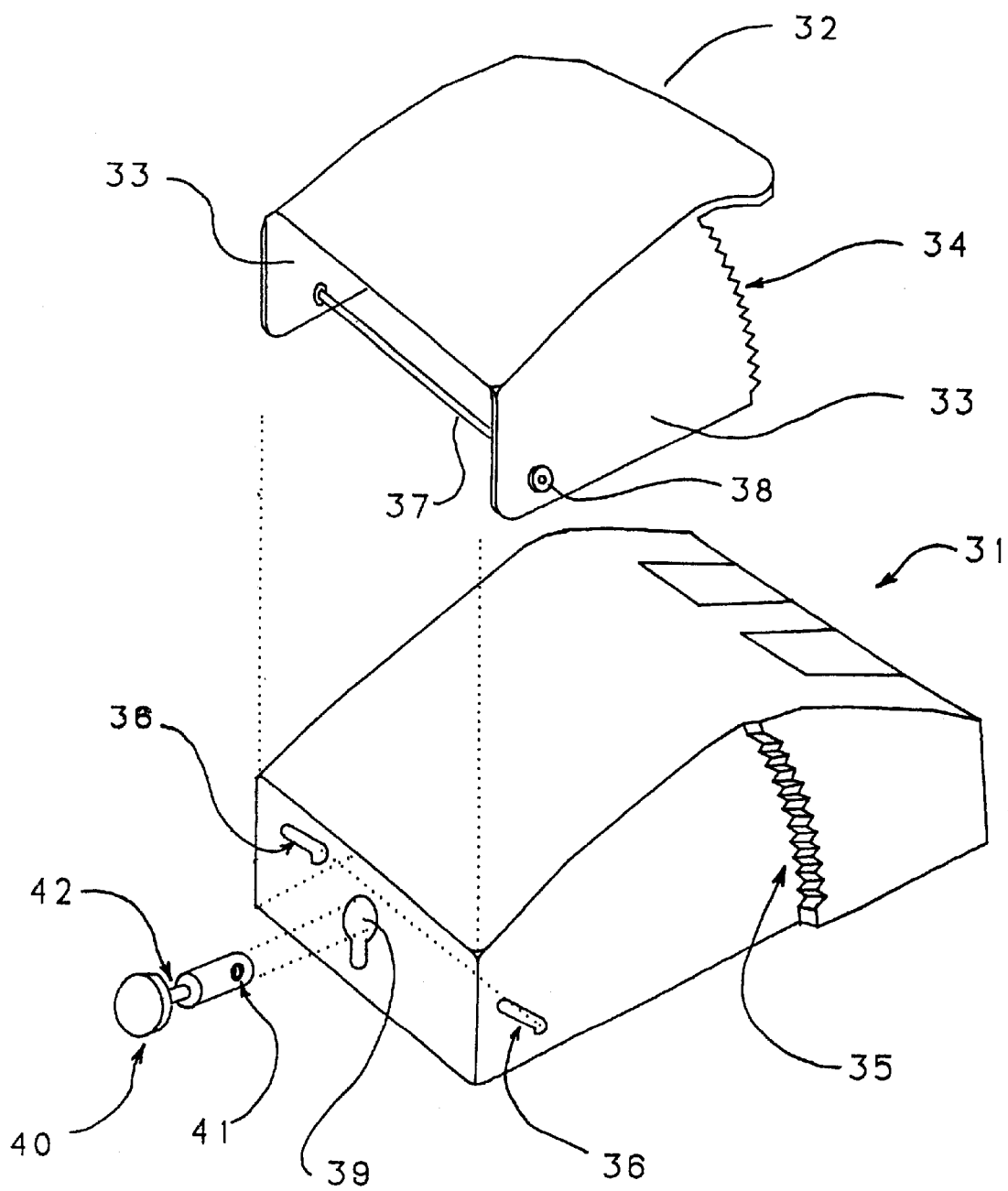

MULTIPLE SIGNALING MOUSE WITH FACETED SURFACES

A continuation of Ser. No. 08/400,122 filed Mar. 6, 1995 now U.S. Pat. No. 5,754,168, which is a continuation of Ser. No. 08/091,909 filed Jul. 16, 1993, now abandoned which is a continuation of Ser. No. 07/657,118 filed Feb. 19, 1991 now as U.S. Pat. No. 5,260,696.

BACKGROUND IN THE FIELD OF THE INVENTION

The mouse has become a common device for control of cursor movement on a CRT screen. All mice employ the principle of a contained sphere rolling on a surface, generally a flat desktop. Two counting wheels are positioned around the sphere, usually at the horizontal equator; the wheels are positioned with axes of rotation that are orthogonally at 90 degrees to each other. A third wheel is usually provided as a tensioning roller placed near the same equator on the opposite side of the sphere for the purpose of keeping the sphere in contact with the two counting wheels. The housing of a typical mouse also provides means for keeping the polar or vertical axis of the sphere stabilized during rolling motions. The housing usually exposes only the extreme bottom pole of the sphere which of course rolls on a desk or pad surface; the sphere usually protrudes from the flat underside of the mouse housing. Since the housing may carry a panel for removal and cleaning of the sphere and assorted screw holes and molding incentations, a number of smooth feet or projections are usually provided to elevate the underside slightly above a desk surface. The feet are often of slick polymer, such as teflon for ease of sliding.

A mouse also carries one or more keys which signal a computer to perform one or another action at whatever cursor location is defined at the time of the "click". Between "click" events the cursor is free to be moved in x y screen coordinates according to the combined signals of the counting wheels which are orthogonally rotated by the sphere. Methods to count amounts of rotation at the orthogonal friction wheels have employed either analog signal acquired from rotary variable resistors on the axles of the counter wheels or digital signal usually acquired by the rotation of a slotted light interrupter disc which acts upon photoreceptors.

It can be seen that mice commonly employ two types of signal interfaces: 1. the variable signal values derived from the rolling sphere and its apparatus and 2. the keys which actuate simple on/off pulse switches.

Some mouse design has attended to ergonomics of human use, for example the housing shape has been externally rounded by some manufacturers, with the intent of fitting the shape of the palmar aspect of the relaxed hand. This has been referred to as the "Dove Bar" shape in a review article on input device ergonomics (PC Magazine, Aug. 90, p.216).

Some mice employ "ballistic" sensing, ergonomics by software design, to cause resolution accuracy of mouse movement to be variable with the speed of signalling derived from the sphere movement. Much of the ergonomic success of a mouse in a given computer application depends on how the application software design utilizes the mouse, in terms of snapping on menu choices or within an on-screen drawing.

Most computer assisted drawing softwares (CAD) have at least two methods of defining endpoints of lines with a mouse key: 1. a click to the actual cursor position or 2. a click that searches out and locks the end point to a known point of an on-screen entity—for example to one end of an arc. Usually the CAD user can also toggle the software between two dimensional cursor movement (sum of XY vectors) and orthogonal cursor movement. The orthogonal movement is simply a method of ignoring the lesser of the X or Y vectors derived from realtime mouse movement, so that the cursor moves only along the pure X or the Y vector. Such modes of operation are usually toggled by either a keyboard command or possibly by menu choice using a mouse click key.

The mouse has become an established tool in the control of screen displays. Many prefer it to a full digital pad input device, because of its portability to use on any smooth desk surface, however the status quo of mouse signaling seems to be that of pulse signals chosen by the digits (fingers) of the user, and the variable data of vectors for cursor movement derived from whole arm movement of the sphere and its counter apparatus.

OBJECTS OF THE INVENTION

It is the intent of the invention to provide additional signals from a single mouse held continuously in a single hand of a user; these signals used to alter the status of a software and cursor operation, and particularly for ease of control of toggled choices within a software, these controls having been heretofor limited to:

Keyboard commands which entail movement of a hand to the appropriate keys of a keyboard Mouse click actions which entail either the full dedication of a mouse key to a given toggled function or movement of the cursor to a given menu choice and clicking with the assigned "menu selection" mouse key.

It is the intent of the invention to not add any plethora of mouse keys or switch sites for actuation by any fingers of the hand which holds a mouse. Three key mouses are considered to be marginally better than 2 key mouses. There are 3 fingers available while the thumb and the 5th (or little) finger are needed to grasp the sides and stabilize the mouse during movement. The addition of more than 3 keys invokes the need to move one of the 3 fingers between the more than three key choices. Such addition of "click" keys to a mouse is not a qualitative improvement and it has a downside ergonomic loss, as the user must search with fingers for the vital tactile reference points of additional keys.

With the mandate to not add tasks for the fingers of a mouse controlled in a single hand, the invention must resort to the interaction of other body parts and new mouse parts. The arm movement is devoted to mouse movement on the two dimensional flat desk surface with accuracy that should not be impeded. The mouse should have generally rigid housing, which should be stable to the grasp of a thumb and 5th finger which occasionally must lift the mouse from the desk surface in order to get the mouse back within the available "playing field" surface.

SUMMARY OF THE INVENTION

A conventional mouse has dedicated a single plane, provided in the housing configuration, for relationship to flat surface. The tracking sphere operates within the single plane, the exposed sphere surface being approximately tangential within this plane during operation. The conventional mouse is referred to henceforth as a monoplane mouse.

The invention employs multiplane facets on its underside so that whole mouse movement may provide additional signalling, depending on which facet of the mouse housing is contacted to the operating desk surface. Movement from one face or facet to another, requires only a coordinated wrist movement, tilting the mouse across the fulcrum interface between one facet and another. No finger motions are necessary, and the thumb and 5th finger continue to perform the dominant role of stabilizing from opposed sides while the mouse is carried within the curve of the palm.

The facet mouse may provide two, three, or four underside faces; more than four is geometrically feasible, of course, but offers diminishing returns of unstable size and angular separation from each other. The facets provided are, of course, cut out from the unitary single plane which is the minimum requirement for a mouse operating on a desk surface, and the facets are contiguous intersecting planes.

Just as contiguous facets of a crystal may share a single edge, point, or corner, this intersect of facets is the site employed for placement of the tracking sphere necessary for mouse operation. Therefore, a single tracking sphere and its sensing apparatus can operate in tangent for any chosen facet.

Pressure sensitive switches are provided on the faceted mouse, which are actuated when the mouse is tilted to rest on a given facet. The known condition of one or more actuated switches is sufficient to identify a single facet as the contacting surface. Since a switch as a component must be mounted on mouse housing surface, anyway, it is chosen to combine functions by the employment of switches as feet protrusions on each facet.

Generally, the faceted mouse is preferred to employ triangular facets with three points of actual desk contact, the tracking sphere at the common intersect of all facets, and pressure sensitive switches on each facet situated more outlying.

In the operation of a mouse with multiple facets it is required to maintain the mouse consistently on a single facet, which may toggle given mode of cursor behavior or program operation. Consistent tilting of the mouse requires a steady pressure toward the chosen facet and it is preferred to allow weight of the hand to provide such pressure passively, rather than to use the available thumb and fifth finger to apply downward pressure. However, it is common for a modern mouse to contain a small quantity of electrical components and a rather large amount of empty space within its housing. Such a small mouse is portable and unobtrusive, but often insufficient to fill the concavity of the palm and so function as a hand rest.

The invention employs a hinged, hooded top to a mouse which may be raised to provide a full palm rest for a hand resting its weight upon a mouse. The hood may also be retracted to the standard top surface substantially flush to the level of keys.

BRIEF DESCRIPTION OF THE DRAWINGS

FIGS. 2 A and B are orthogonal views of a monoplane conventional mouse.

FIGS. 3 A and B are orthogonal views of the two facet mouse invention

FIG. 6 is a perspective view of an adjustable palm rest improvement for a faceted mouse.

Figure 1:
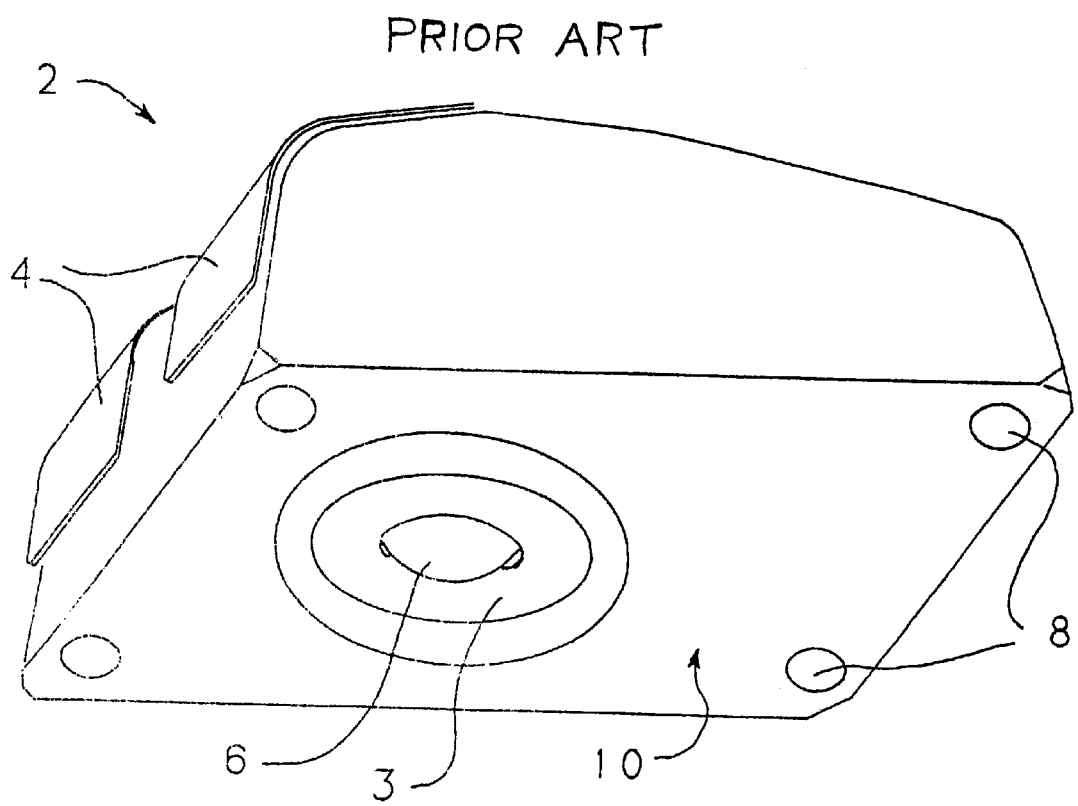
FIG. 1 is a perspective view of a conventional mouse

REFERENCE LIST 2 conventional monoplane mouse
3 lower retainer ring
4 key
5 upper ring yoke
6 tracking sphere
8 feet
9 flat surface
10 monoplane surface
12 A,B biplanes
13 intersect of biplanes
14 optional feet
16 3 point plane outline
18 angle of biplanes
20 A,B,C,D quadplanes
21,22,23,24 feet
31 mouse body
32 hinged palm hood
33 sides of palm hood
34 arc edge
35 inset arc face
36 inclined slot
37 axle
38 retainer
39 keyhole
40 pin
41 axle hole in pin
42 neck of pin
43 spring
45 point on intersect 13
49 upper pole axis
50 lower pole
51 upper ring yoke
52 angle of tilt
53 angle of ring yoke
54 counter wheel equator
55 vertical axis
60 bracket

DESCRIPTION OF THE PREFERRED EMBODIMENT OF THE INVENTION

FIG. 1 is a perspective view of a conventional mouse 2, with keys 4 and a single plane bottom defined by feet 8. The tracking sphere 6 rides within the housing and is exposed generally in the center of the single plane 10 which the housing provides. Typically the sphere is loosely fitted in the housing with some play in the vertical dimension, so that the sphere may drop by its own weight so that the surface of its lower, exposed pole touches and rides (tangentially) the same desk surface which is congruent with the plane defined by the four feet. It is common for the upper pole of the sphere to have a circular bearing surface of smooth material that limits upward movement of the sphere, otherwise the sphere could be pushed out of sight and lost in the housing of the mouse. Similarly, a lower retainer plate 3 with a circular opening keeps the sphere from falling out of the housing.

As discussed in the preceeding section ("Background of the invention") the tracking sphere commonly is held stable in its horizontal plane by its position between the two orthogonal counting wheels and one (or two) idler/tensioning wheel(s); the total of 3 (or 4) wheels contact the sphere at its horizontal equator. Common electrical circuitry is employed to acquire signals from the two counting wheels which are the summation of any single vector of rotational movement of the sphere. It is important to note that the equatorial plane contacted by the counting wheels is parallel to the desk surface and the single plane underside of the conventional monoplane mouse.

FIG. 2 shows a monoplane mouse in an underside schematic view (A) and a frontal view (B).

In view A, the single plane 10 is defined by the typical four feet (8) which must be well aligned, since only three feet can define a plane of 3 points by default without concern for the alignment of a fourth point. The virtual plane defined by dotted line 11 connecting the feet 8 is the plane which contacts the operating surface 9 and upon which the sphere must move. In various conventional mice, the shape of this virtual plane 11 may vary in outline (square,rectangular, triangular, and truncated triangular), but the joined outline is a monoplane nonetheless.

The conventional position of the tracking sphere 6 is central to the virtual plane perimeter at dotted line 11.

FIG. 2B, the frontal view of a conventional monoplane mouse, shows the sphere 6 resting on a flat surface indicated by line 9. On the same surface 9, the feet 8, bear the weight of the mouse housing and apparatus as the sphere floats free. In this view,it should be appreciated that if a tracking sphere such as 6 is intended to bear any weight of the mouse housing and apparatus (rather than floating freely within and bearing only its own weight), then the upper pole of the sphere must bear against a smooth, slick-surfaced upper ring-yoke with less friction co-efficient than that of the sphere 6 rolling on the flat surface 9. Such a ring-yoke is depicted at 5. In practice most mice are designed for the sphere to float and not bear any weight of the housing against such a yoke, which serves only as an upper retainer to prevent loss of the sphere into the housing. The corollary to this is that all sensing apparatus and the sphere within a mouse can be made small, but the housing must still be a reasonable size to be grasped in the hand.

FIG. 3 depicts underside view 3A and frontal view 3B of a two facet mouse.

FIG. 3B shows the extended dotted lines of two virtual planes 12A and 12B which intersect at angle 18. The tracking sphere 6 is shown at the intersect of the two planes and protrudes sufficiently to be exposed for rolling movement against a desk surface regardless of which plane (12A or 12B) the mouse is tilted to during contact.

In FIG. 3A it is seen that a given virtual plane such as 12A can be defined by only 3 points joined by dotted line 16 through feet 23 and 24 and sphere 6. in such a case the sphere would have to share the weight bearing of the entire mouse housing, in which case a smooth circular yoke would have to bear upon the supportive sphere 6. The sphere can serve as a common bearing point for both planes 12A and 12B while generating signal by rotation. Such a yoke is depicted both in FIG. 2 #5 for the conventional mouse. Besides smooth polymers such as teflon, a yoke may provide a ball bearing ring for minimum friction.

In FIG. 3A, the two feet 14 shown on the intersect line 13 are in dotted outline to indicate that these feet may be provided optionally for stability, as long as feet at these locations do not intrude into either plane 12A or 12B so much as to cause the tracking sphere to be lifted from contacting a desk surface. The two feet added at 14 can however define a plane which supports the mouse housing while allowing the sphere 6 to float and not bear housing weight, as is common in the construction of conventional monoplane mice.

To recognize which plane is. employed for mouse action, pressure sensitive switches can be placed within feet of each plane providing electrical sensing of desk contact within a given plane. To sense either of two planes, a single switch is placed in either foot 21 or 22 for plane 12A and either foot 23 or 24 for plane 12B.

In FIG. 3B it should be noted that the angle of the two planes shown by dotted lines at 18 is exagerated for the purpose of depiction; a small angle could be sufficient to separate two planes, provided there is minimal play in the pressure sensing switches provided in the feet.

Figure 4:
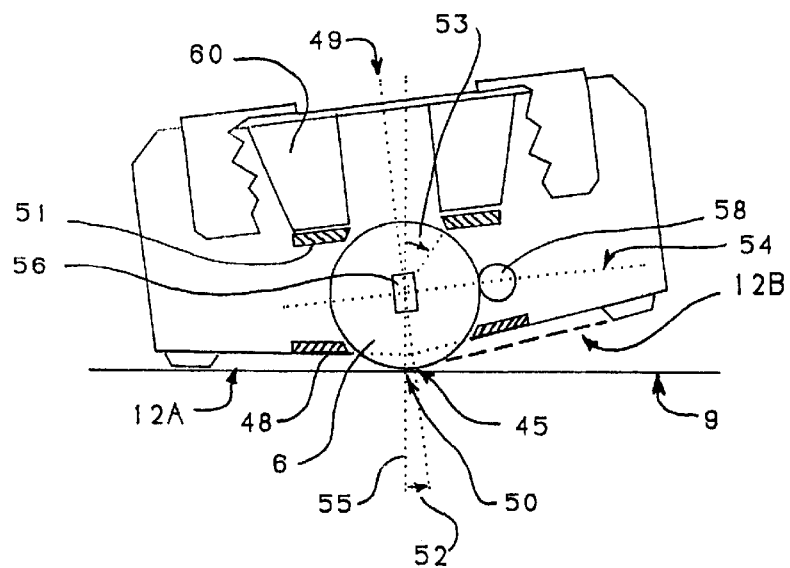
FIG. 4 is a frontal view of a two facet mouse.

FIG. 4 is a schematic frontal cross-section of a two face mouse resting on flat surface 9. The tracking sphere 6 is shown aligned with an upper ring-yoke 51 which is fixed by brackets 60 to the housing of the mouse and a lower retainer ring 48. The upper pole of the sphere protrudes into the yoke and is indicated by the axis 49 which is perpendicular to the plane of the ring 51.

The angle 52 indicates the tilt of axis 49 from vertical 55 onto one of the facets. The angle is instructive for two reasons. First, in regard to weight bearing upon a tracking sphere which must be stabilized within the ring-yoke at its upper pole. The ring-yoke should provide a diameter to contain the sphere at a latitude angle 53 which is larger than the angle of tilt of the polar axis 49 in relation to the desk surface to provide stability to the sphere during a tilting maneuver.

Also depicted in schematic FIG. 4 is another design concern for a faceted mouse. In a common monoplane mouse it is a common prerequisite that the two counter wheels which monitor sphere rotation should be placed orthogonally at 90 degrees in a plane which is both parallel to the monoplane (the desk surface) and at the equator of the sphere. This is required to generate as nearly as possible, two pure perpendicular vectors of counting as the sphere rotates. Therefore, in a single orthogonal motion of the mouse, the one counter wheel rotating parallel with the motion would count a full circumference and the other counter wheel, rotating perpendicular should not rotate, but should slip or pivot at its point of equatorial contact. In practice, for most movement (non-orthogonal) both wheels have a combined slip and rotation and the screen cursor is the visual feedback for the operator to correct to. However, it should be noted that with a monoplane of motion and a parallel equator of counter wheel sensing, both wheels are in contact with a full spherical circumference of the sphere.

In a faceted mouse, it is preferred to have a single sphere and counting apparatus serving two or more planes, but the counting equator cannot be parallel to two or more facet planes which are served.

FIG. 4 shows counting wheels 58 and 56 on a counting equator 54. It can be seen that the equatorial plane is not parallel to either facet plane 12A or 12B, and it is symmetrically angled between the angles of 12A and 12B. The lower pole of the sphere for axis 49 is shown as a point 45, which is the point of intersect line 13 for the two virtual planes 12A and 12B discussed in FIG. 3. Virtual plane 12A is congruent with the flat surface 9 upon which it is tilted; the edge of virtual plane 12B is shown in this frontal view as a dashed line tangent to the sphere and to the foot of the up-tilted facet. It can be seen that wheel 56, has a plane of rotation parallel to the intersect 13 (depicted in FIG. 3A), which projects to a single point 45 in the frontal view. With this alignment of the intersect of two planes (at #13) to one of the two orthogonal placed counter wheels (#56 in this case), then the counts of sphere rotation will be similar for mouse movement upon either tilted facet (12A or 12B).

For example in a pure frontal motion of the two facet mouse, wheel 56 would rotate parallel to such motion, and would not slip or pivot as would wheel 58. However wheel 56 cannot count at a full circumference which is congruent with the vertical plane through the point of contact 50 of the sphere at axis line 55. Wheel 56 counts a lesser circumference which corresponds to a vertical plane through point 45, some degrees away from the vertical. This error can be minimal for refined facets which present facet planes which may be only a few degrees apart. Furthermore, the error is least for all facet tilts, by placing the counter equatorial plane symmetrically in relation to the two (or more planes) as shown.

A mouse need not be limited to only two counting wheels at a single sphere, even though two counter wheels can calculate all XY vectors. And software and electrical methods can calculate orthogonal signal values from counter wheels which need not be placed orthogonally at a single sphere. However, given the preferred embodiment of one sphere and a two counter wheel apparatus to serve two or more facets in a multiplane mouse and given that orthogonally placed counter wheels are preferred, it follows that the next step improvement of a biplane or two facet mouse, is a four facet mouse.

Even if 3 contiguous facets (such as at the point of a tetrahedron) are provided with an intersect angle which is sufficiently shallow to serve as the underside of a mouse, the three planes could not join edges around a projected 360 degrees without exceeding 90 degree increments (or leaving a fourth distance undefined). Three planes, not aligned to the orthogonal positions of the counter wheels would introduce counter variation even though in a predictable amount for given orientations. Therefore the next embodiment of a faceted mouse is presented as four facets which is considered to be a preferred maximum without incurring disadvantages in proprioceptive discrimination during use.

FIG. 5 depicts a 4 facet mouse in schematic underside view 5A, frontal view 5B and side view 5C.

Figure 5A:
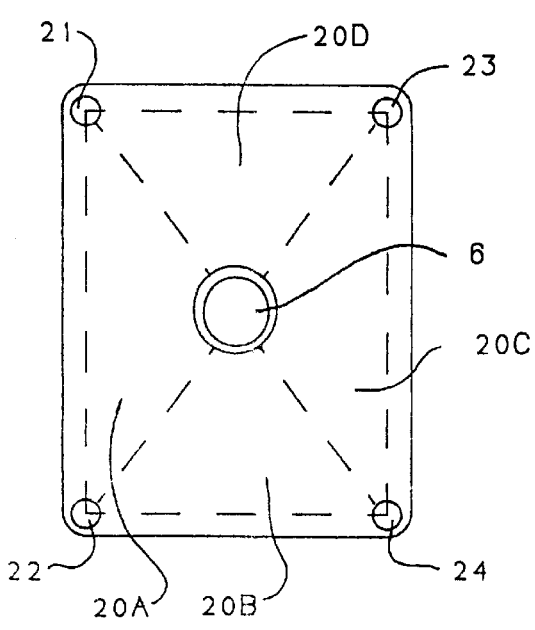
FIGS. 5 A, B, and C are orthogonal views of the four facet mouse invention

FIG. 5A depicts four planes 20 A,B,C,D with the tracking sphere 6 located at the common intersect which is now a virtual point, not a line intersect as in the biplane version of FIG. 3. In the 4 facet configuration, it is preferred that the tracking sphere 6 be partial weight bearing for the mouse housing rather than floating within the housing, so that each facet plane can be defined by 3 points of bearing: two feet and the sphere at the common intersect point of all facets.

To determine that the mouse has been tilted to a given facet, for desk top action, four contact switches are required. Since the contact switches are congruent with the feet and the feet are shared at the intersects of contiguous planes, then the condition of two of the four switches must be known to identify a single facet as making contact with a desk surface. As depicted, the pressure sensitive switches placed in protruding feet on the facets and identifying respective facets are: for facet 20A, switches 21 and 22; 20B, switches 22 and 24; 20C switches 24 and 23; 20D switches 21 and 23.

It must be emphasized that pressure sensitive switches on the exterior surfaces are preferred, but other sensing means can be employed, including mercury or other switches which respond inherently to tilting. Switch mechanisms can be designed to be within the housing and interact with specifically designed surfaces during tilting, provided that a vertical reference is maintained which is shielded from the vagaries of inertial changes during mouse XY motions. Pressure sensitive switches within feet protrusions are preferred. Refined design could call for a spring buffer between a slick membrane bearing,the brunt of sliding over an operating surface and the actual switch contact being more recessed into the housing.

Figure 5B:
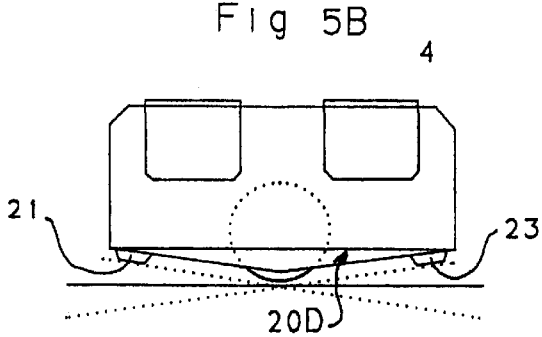

FIG. 5B depicts the 4 facet mouse in frontal view, with facet 20D exposed to surface view. Feet containing pressure sensitive switches are shown at 21 and 23.

Figure 5C:
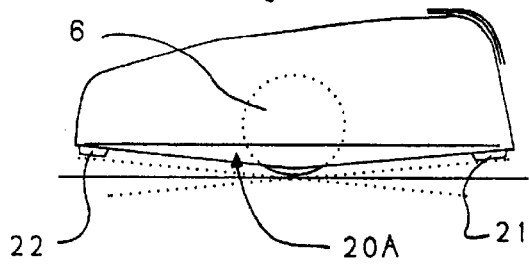

FIG. 5C depicts the right side view with facet plane 20A angled into 2 dimensional view.

As disclosed in the previous description for the 2 facet mouse and FIG. 4, in the 4 facet mouse, the angles of the planes in frontal and side views determine the necessary angle of latitude for the placement of the upper ring-yoke.

Also as previously described, the preferred requirement is to have at least one counter wheel parallel with the intersect edge of any two opposed facets. In the 4 facet mouse the two intersects which define opposed faces of the 4 facet mouse should be in 90 degree relationship, aligned with the orthogonal counter wheels.

FIG. 6 is a perspective view of a mouse body 31 and hinged palm hood 32 which has sides 33. An axle 37 is joined between the sides by retainers 38 and the axle passes through the rear portion of the mouse body at two slots 36 which are oblong and inclined toward the rear.

The hood 32 can pivot on the axle in an arc which corresponds to an arc edge 34 which carries projections or teeth. An inset arc face 35 is provided on the two sides of the mouse body 31, provided with projections or teeth in a matching pattern to the arc edge of the hood. When the hood is moved on its axle down and forward in slots 36 it meshes at the arc edge 34 and arc inset 35. The axle 37 also passes through a hole 41 in a pin 40 which passes through a keyhole 39 in the rear of the mouse body. Since the pin has two diameters and a neck 42, the pin may be locked within the mouse body when pushed inward and forced down into the narrow slot of the keyhole.

It can be seen that to lift the hood or lower it, the hood can be unmeshed at the arc edge/arc inset, by lifting the pin from the keyhole slot and pulling the pin backward through the circular portion of the keyhole, such that the axle and hood move back and up in the two slots 36. When the desired position is found, the axle is pushed down and forward such that the arcs are meshed, and the neck 42 of the pin is locked in the keyhole slot.

FIGS. 7 A,B,C are side views of a mouse with an adjustable palm hood 32.

Figure 7A:
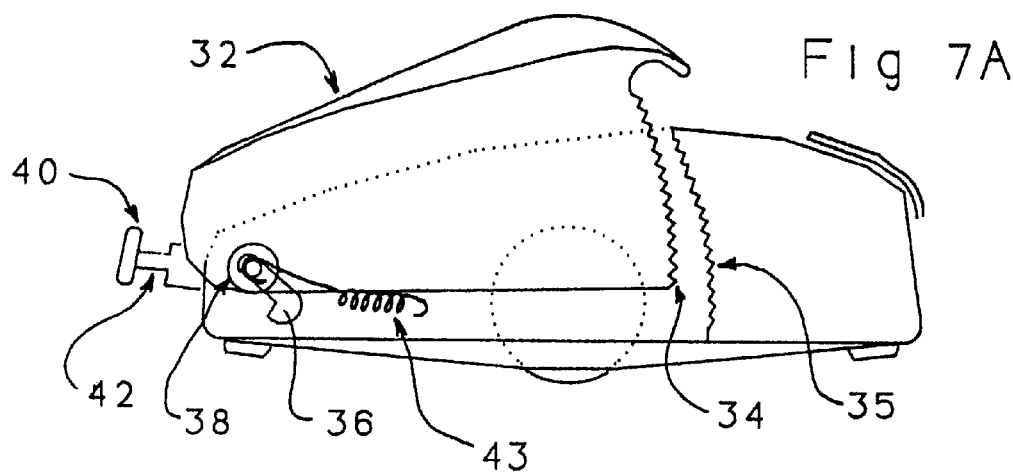
FIGS. 7 A,B, and C are side views of an adjustable palm rest for a faceted mouse.

In FIG. 7A, the axle at 37 is pulled up and back within slot 36 by the action of pin 40 which is aligned and joined with the axle and is unlocked from the keyhole such that neck 42 is revealed. An optional spring 43 is shown which can aid in pulling the hood and arc edge 34 back to engage arc inset face 35. Even without the spring, it can be seen that downward force of a hand resting on the hood can force the hood forward as the axle 37 is forced to slide forward and down in slots 36.

Figure 7B:
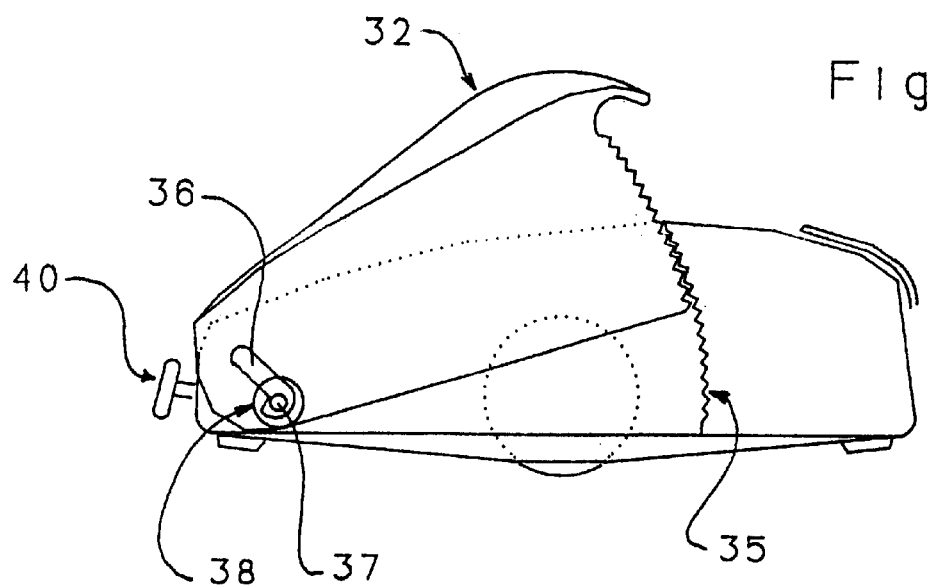

FIG. 7B shows the hood 32 locked in an upward hinged position in which case, the axle 37 is forced downward and forward in the slots 36 to engage the toothed arcs. To lock the axle 37 in this position, the pin 40 is not only moved forward as it is joined to the axle, the pin is pivoted downward such that the neck and the slot of the keyhole are engaged (the keyhole and neck being shown in FIG. 6).

Figure 7C:
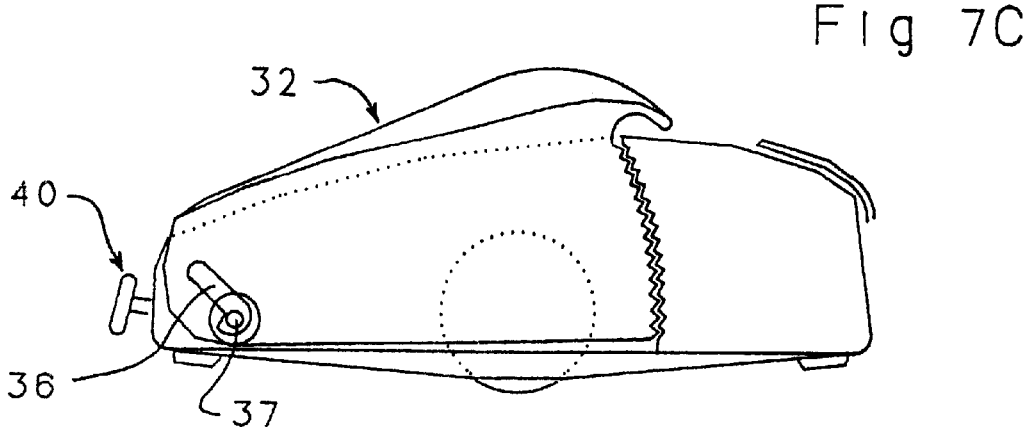

FIG. 7C show the hood 32 fully downward and also meshed at the arc edges by the downward and forward position of axle 37

FIGS. 6 and 7 describe a preferred means of raising a top surface portion of a mouse by hinging. Although the hinged top could be held up by various means such as sliding and folding brackets and also pivoting cam pieces, the use of two arc surfaces of the mouse body and the edges of the hood is a preferred means. The adjustable palm hood allows for expansion of mouse size to serve as a full hand rest, and collapse into a smaller more portable configuration.

As described above, a faceted mouse provides a geometry for consistent signaling of choice by a mouse. Each facet and its associated pressure sensitive switches provides an on/off choice which may toggle a machine or computer task. The faceted mouse does not require any change in the use of the digits of the operating hand; as described, the thumb and fifth finger are primarily dedicated to the proprioception and stability of X-Y motion of a mouse on a desk surface and 3 fingers remain, at the ready, for the operation of up to 3 click keys. The provision of 4 facets add at least four toggle choices that are available instantaneously by a motion of wrist tilt toward a given facet.

These additional toggle choices may be utilized by software developers in such a way that these are continuously available without resorting to menu choice loci. For example, additional toggles could be used to toggle between 3d and orthogonal modes of drawing instantaneously without resorting to key command or menu located choices. Another use would be to alternate instantly by a wrist motion between two or more on-screen cursors.

A joy stick is a tilting mechanism guided by wrist/arm movement whether to obtain on/off or continuously variable signals. The conventional single plane mouse offers no use for the arm other than X-Y movement over a flat surface. The faceted mouse provides component shape and relationship to acquire signal from heretofore unused potential for arm-wrist movement without detracting from the conventional use of the digits. A single tracking sphere with the necessary orthogonal counter wheels can serve all facets at the intersect of their planes.

It can be seen that a faceted mouse is a tool design opening a way to many potential applications; and variations of the principles disclosed here are within the scope of the principles and methods invoked in the embodiments disclosed above. The characteristics of the invention are further described in the claims.

I claim:

1. A coordinate input device or mouse containing a tracking sphere in its underside and contacting an operating surface and surrounded by two counting wheels enabled to tabulate rotation of said sphere in two axes for communication of coordinate information to a computer software program wherein said underside is divided into four planes oriented outwardly and said planes defined by four edges converging generally to an intersect area which points outwardly said tracking sphere is located at said intersect area and enabled to contact said operating surface during complete tilting onto any of said planes said input device enabled to communicate coordinate input information to said software while tilting is maintained on any of said planes.

2. The device claimed in claim 1 wherein: said planes are designated as A,B,C,D for purposes of identifying planes in a contiguous counting of planes in either clockwise or counter-clockwise directions around said intersect area each of said counting wheels is mounted with an axis of rotation defined as respectively a first axis and a second axis for said two counting wheels wherein planes A and c are oriented parallel to said first axis and planes B D are oriented parallel to said second axis.

3. The device claimed in claim 1 wherein a signalling means is provided to indicate that any one of said planes is maintained as the operating plane of said input device which is in contact with said operating surface wherein tilting onto any of said operating planes indicates a toggled condition signalled to said software and is assignable by said software to carry out any action of said software which is normally associated with a menu choice locus or key commands.

4. The device as claimed in claim 3 wherein said signalling means is provided as pressure sensitive switches on the underside of said mouse body wherein four switches are provided corresponding respectively to four said planes provided in underside of said mouse body.

5. The device as claimed in claim 4 wherein said four switches are situated in the four edges which define the intersecting four said planes wherein the condition of two switches must be known and signalled to indicate that any given plane is maintained on said operating surface and a single switch may signal only that its respective single edge is contacted or removed in respect to said operating surface.

6. The device as claimed in claim 1 wherein:

a signalling means is provided to indicate that any one of said planes is maintained as the operating plane of said device which is in contact with said operating surface multiple onscreen cursors are provided by software each of said cursors is associated with one of said operating planes a given one of said cursors is chosen for manipulation according to said coordinate input information by maintaining said tilting on one of said planes.

7. The device as claimed in 5 wherein said software provides multiple onscreen cursors, each of said on screen cursors associated and assignable by said software to a set of conditions for said four switches, said tilting of said mouse providing signal for the selection of a given one of said cursors for manipulation according to said coordinate input information.

8. A coordinate input apparatus or mouse having a hand operated body to input coordinate information of a software defined work plane of a computer assisted drawing program enabled to define projections of a three dimensional object and each projection useable as said work plane, said body comprising:

a bottom portion having first, second, third, and fourth input planes which are not all located in the same plane where each of said input planes corresponds to one of said work planes as defined in said program wherein each of said work planes is individually selectable by selecting its corresponding input plane, coordinate information of said work plane being received as input into the selected work plane by the action of tilting onto its corresponding input plane, and detecting means provided at each of said input planes, for detecting movement of the body corresponding to coordinate information to be input and provided at the intersect of said input planes.

9. A coordinate input apparatus or mouse having a hand-operated body operated upon a ground plane to input coordinate information into computer software which is able to perform tasks represented on a display and a moveable cursor for activating a coordinate location and menu located choices at various coordinate locations, said body having:

a bottom portion having first, second, third, and fourth input planes which are not all located in the same plane, where any of said input planes is assignable to correspond to a software task and said task is individually selectable by tilting said body to maintain said corresponding input plane in parallel with said ground plane, a coordinate detection unit comprised of a rotatable sphere contacting said ground plane and contained within two orthogonally positioned counting wheels enabled to acquire an amplitude of motion from the rotating surface of said sphere along two vectors during movement on said ground plane, and said detection unit positioned contiguous with all of said input planes, and said detection unit providing coordinate information to said software while said tilting is maintained onto any of said input planes.

\* \* \* \* \*